UNITED STATES PATENT OFFICE.

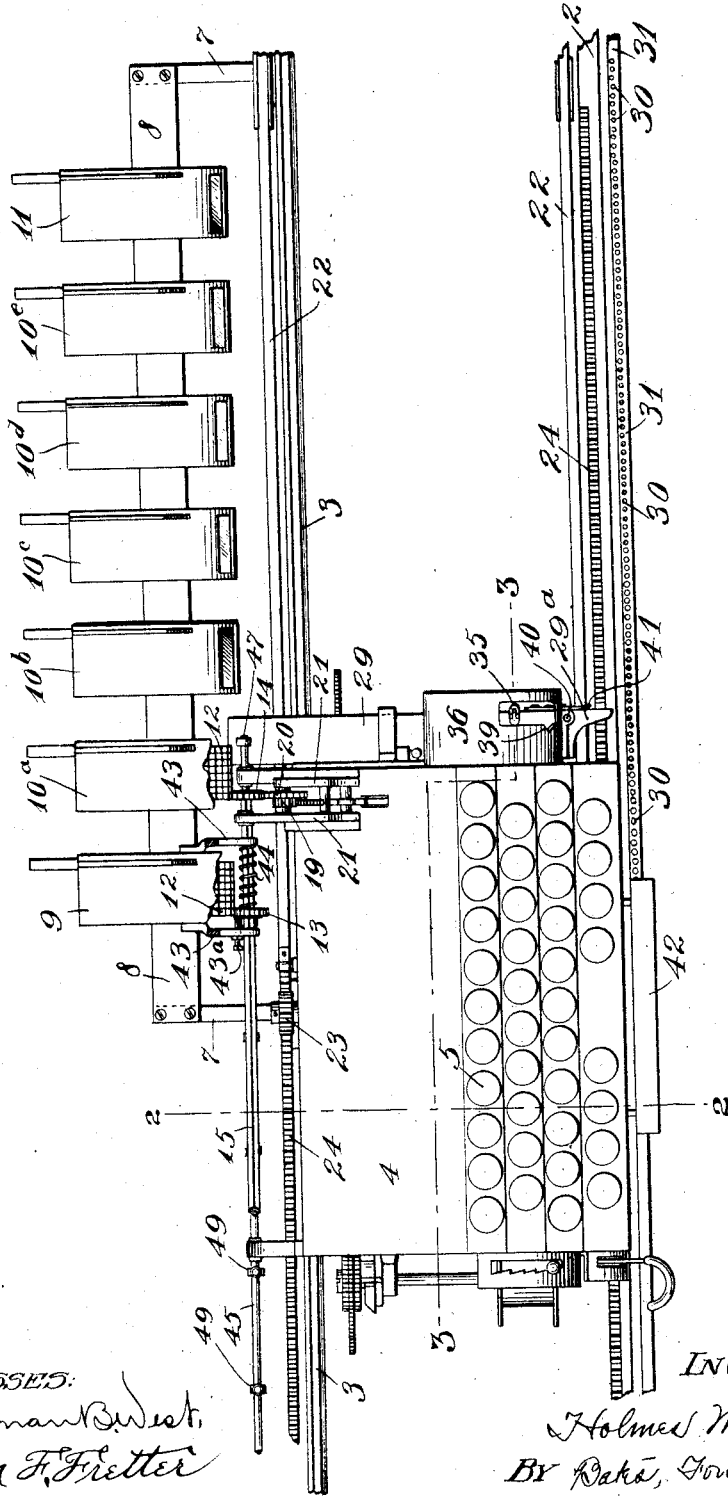

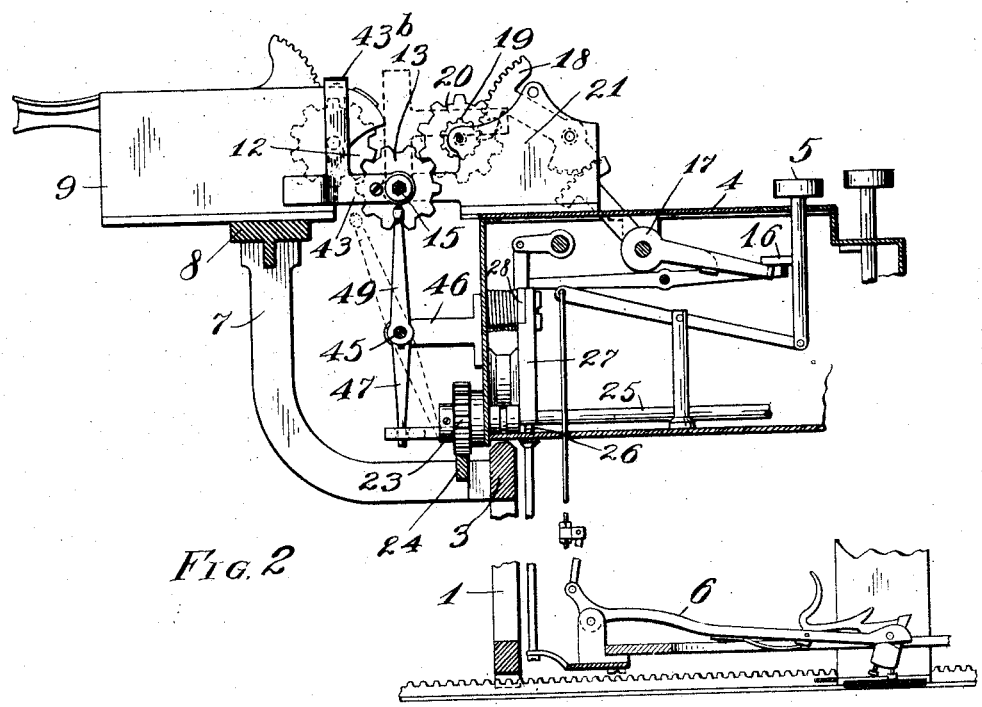

HOLMES MARSHALL, OF NEW YORK, N. Y.

COMBINED TYPE-WRITER AND COMPUTER.

982,518.  Specification of Letters Patent.  Patented Jan. 24, 1911.

Application filed September 28, 1907. Serial No. 394,950.

*To all whom it may concern:*

Be it known that I, HOLMES MARSHALL, a citizen of the United States, residing at New York, in the county of New York and State of New York, have invented a certain new and useful Improvement in Combined Type-Writers and Computers, of which the following is a full, clear, and exact description, reference being had to the accompanying drawings.

This invention relates to combined printing and accounting machines, which machines may be of the type shown and described in the patent to Laganke and Smith, No. 820,879, although the principles of my invention are of more general application, the same being shown as embodied in the Laganke and Smith machine for convenience of illustration and description.

One object of my invention is to provide a machine that will print in a transverse line a plurality of numerical items, and to combine with the printing mechanism an accounting device which will keep a total of such items, so that, as the items are printed in the line, the total of said items will appear on the accounting device and may also be written in said line.

Another object of my invention is the provision in such machine of a series of detail accounting devices, one for each vertical row of items that may be printed by the machine, said detail accounting devices keeping a total of all the items in their respective vertical columns.

A further object of my invention is to keep a grand total of all of the items in all of the columns, or in other words, a grand total of the totals of the items in the several transverse lines, and, for accomplishing this object, I provide the machine with a grand total accounting device which shows at all times the total of all of the items and from which the operator may at any time ascertain such total and may print the amount on the machine.

Other objects of my invention will be set forth in connection with the specific description of the invention shown in the accompanying drawings, in which—

Figure 1 is a plan view of my combined printing and accounting machine, portions of the machine frame being broken away for clearness of illustration; Fig. 2 is a transverse section taken through the machine substantially on the line 2—2 of Fig. 1, certain of the parts being shown in elevation and others broken away; Fig. 3 is a transverse section taken through Fig. 1 substantially on the line 3—3 of that figure, parts of the mechanism being omitted for clearness, and Fig. 4 is a side elevation of the tabulating mechanism, parts of the same being shown in section.

Taking up a more detailed description by reference to the drawings, in which the same reference character designates the same part throughout the several views, 1 represents the machine frame, which is provided with front and rear carriage guides 2 and 3, upon which guides there is supported a transverse traveling carriage 4. Mounted upon this carriage are the finger keys 5, containing the numeral keys, and the type bars 6, with their connections, said keys, bars and connections, being substantially the same as those shown in the book-typewriter of the Laganke and Smith patent above referred to, to which reference may be made for a fuller description.

Projecting from the rear portion of the frame 1, are bracket arms 7, which support a bar 8, upon which I mount a detail totalizing register 9, a series of detail registers $10^a$, $10^b$, $10^c$, $10^d$, and $10^e$, and a grand totalizing register 11. These various registering devices are substantially the same as that shown in the said Laganke and Smith patent, and reference may be made thereto for a fuller disclosure of the details of the construction thereof. These registering devices may be adjustably attached to the bar 8 so as to secure any desired spacing of the vertical columns, such attaching means being of any suitable type. As shown, each of said registering devices consists of a plurality of wheels 12 which are mounted side by side in a suitable casing, and the said wheels are turned for adding the amounts of the various items by means of idler pinions 13 and 14, said pinions being carried by a shaft 15 that is journaled in suitable bearings on the carriage. The pinion 14 is secured to the shaft 15 so that the shaft is turned with said pinion. The pinion 13 is mounted to slide upon the shaft, but is forced to rotate therewith, the shaft being feathered, or squared, or otherwise so formed as to secure these operations. The pinion 14 is adapted to mesh with teeth formed upon the adding wheels 12 of the detail registering devices $10^a$ to $10^e$, and also with the wheels of the grand total adder 11, while the pinion 13 is adapted to mesh only with the wheels of the detail total adder 9. The pinion 14 is turned to cause the adding wheels to rotate by means of the keys 5, the stems of which are provided with differentially arranged pins 16 which engage with a forwardly extending arm on a pivoted segment 17, said segment gearing with the double segment 18, and the latter gearing with the pinion 19 upon the master wheel 20, said segment 18, pinion and master wheel being suitably journaled in a housing 21 that is mounted upon the carriage. From this description, it will be understood that, upon the depression of a numeral key, the master wheel 20 will rotate an amount corresponding to the value of that key, and that the motion of the master wheel will be transmitted through the pinions 13 and 14 to the wheels 12 of the registering devices with which said pinions may then be in mesh. A suitable clutch mechanism is provided between the pinion 19 and the master wheel, to permit of the return of the segments 17 and 18 to normal position, such a clutch being illustrated in the Laganke and Smith patent, to which reference may be made for a fuller disclosure.

After the operation of each key, the carriage 4 is automatically drawn to the right by means of the steel bands 22 in the usual way, movement of the carriage being controlled by the mechanism shown in Figs. 1 and 3, said mechanism consisting of pinions 23, which mesh with racks 24 on the frame of the machine, but one of said pinions appearing on the drawing. The pinions 23 are secured to a forwardly and rearwardly extending shaft 25, which near its rear end has an escapement wheel 26 secured to it, said wheel being under the control of escapement pawls 27 and 28. These pawls are operated to permit the wheel 26 to escape and the carriage 4 to move whenever a key 5 is depressed in writing, the connections between the keys and the pawls being fully set forth in the patent to Charles F. Laganke, No. 666,762, so that they need not be more fully shown and described herein.

When the carriage 4 escapes as above described, it moves to the right a distance equal to the spacing distance of the wheels 12 in a registering device, thereby carrying the idler wheels 13 and 14 from one adding wheel to the adding wheel next adjacent.

In conjunction with the mechanisms above described, I employ a tabulating device which releases the carriage 4 so that it may be moved independently of the escapement pawls, and brings it to a stop with the idler wheels in mesh with the wheels of highest order in the accounting devices. The tabulating device consists of a sliding rack-bar 29, having mechanism for moving the same, and a series of pins for engaging the rack-bar, the pins being inserted in holes 30 in a frame bar 31. Normally, the rack bar is retracted by a spring 32 so as to be out of engagement with the said pins, but it may be thrust forward into engaging position by means of an idler pinion 33 and a disk 34, the latter having teeth on a portion of its periphery engaging with the idler pinion, and said pinion meshing with the teeth on the rack-bar. The disk 34 is turned by means of a lever 35 which projects through a slot in a hood 36 that is attached to the carriage. The lever 35 normally stands in a vertical position, as shown, and it is pivoted to the disk 34 directly below the center of the latter, the lever extending across the axial line of the disk. When the lever is drawn forwardly the rack bar will also be moved forwardly so as to extend its front end across the line of holes 30, in which position it will be engaged by the pins that may be inserted in said holes.

Pivoted to the lever 35 is an auxiliary lever 37, the upper end of which is normally separated from the lever 35, as shown in Fig. 3. The auxiliary lever engages the outer side of the slot in the hood 36 and, when said levers are pressed together, the lever 35 will be swung inwardly about its lower end, and thus thrust inwardly on a rod 38 that is mounted in the axial line of the disk 34. When the levers 35 and 37 are swung forwardly opposite a notch 39 in the slot in the hood 36 and the levers are then pressed together, the rod 38 will be caused to release the pawls 37 and 28 from the wheel 26 so that the carriage may be moved by hand. The same swinging movement of the levers thrusts forwardly the rack bar 29, so that, as the carriage travels to the right, the bar will engage the pins in the holes 30.

All the mechanism thus briefly described is fully set forth in the Charles F. Laganke Patent No. 666,762, and further disclosure herein is not deemed necessary.

In returning the carriage to its first position for beginning a line, the rack bar 29 is, for reasons hereinafter explained, held in its forward position across the line of holes 30 so that it will engage the pins therein. To enable the rack bar to pass these pins, its forward end is composed of a by-pass pawl 29$^a$, which is pivoted at 40 and is held in the position shown in Fig. 1 by a spring 41. When in this position the pawl cannot swing to the left when it engages a pin, but may swing freely to the right to pass the pins on the return movement of the carriage. After passing each pin, the spring 41 returns the pawl 29$^a$ to its normal position.

The tabulating pins are so spaced in the holes 30 as to arrest the idler wheel 14 when it is in engaging position with the wheel of the highest order in the particular accounting device upon which an item is to be added. The carriage is then caused to move along until the wheel of the desired order is reached by the successive depressions of the spacing bar 42. After the item is added and printed, the operation of the tabulating levers 35 and 37 will release the carriage and cause it to move the wheel 14 into engagement with the wheel of the highest order in the next accounting device to the right. The recurrence of this operation brings the wheel 14, at last, into position for adding the total of the items in the line on the grand total register 11. This total is taken from the detail total register 9, which keeps a total of all the items in the line in a manner now to be described.

As has been stated, the pinion 13 is mounted on the shaft 15 so as to be rotated thereby and to be capable of longitudinal movement thereon. Also mounted on the shaft 15 is a yoke member 43 which is journaled upon the shaft 15, the shaft sliding through the arms of the yoke. These arms surround and inclose on the shaft the pinion 13 and also a coiled spring 44, said spring engaging with the right hand arm of the yoke and tending to press the pinion 13 in the direction of the left hand arm of the yoke and against an adjusting screw 43$^a$. The arms of this yoke are so spaced that they may be depressed over the total detail adder 9 and engage with the sides of the casing of the latter so as to hold the yoke, the pinion 13 and the spring 44 in coöperative relationship with the wheels of said total detail adder, no matter what may be the position of the pinion 14 with respect to the other adders. The yoke 43 is preferably provided with a bail 43$^b$ which may be grasped by the operator in swinging the yoke. Means are provided for shifting the pinion 13 transversely from one of the adding wheels 12 to the next as the carriage moves and to release the wheel when it has reached the adding wheel of the lowest order, so that the pinion 13 may be returned by the spring 44, ready for the addition of the next item. This means is under the control of the rack-bar 29, and it consists of a transverse shaft 45 that is journaled in bracket arms 46, said arms projecting from the carriage. This shaft has a depending arm 47 that extends through a slot 48 in the rear end of the rack-bar, so that, as said rack bar is moved forwardly by the lever 60-35, the shaft 45 will be rocked in its bearings. Projecting upwardly from the rock shaft 45 are a series of arms 49, said arms being adapted to engage at their upper ends with the left hand side of the pinion 13. The shaft 45 and the arms 49 travel with the carriage and push the pinion 13 to the right, thereby bringing the latter into coöperative relation with the different wheels of the total detail adder, the spring 44 being thereby compressed. When the rack bar is retracted, as shown in Fig. 1, the arms 49 are in position to engage with the pinion 13; but when the rack bar is moved forwardly, the shaft 45 is rocked so as to throw the arms 49 out of engagement with the pinion 13, as indicated in dotted lines in Fig. 2. It will be remembered that the lever 35 of the tabulating device is not moved forward until the carriage is to be shifted, at which time the item has been fully registered on the proper detail adder and upon the total detail adder 9. Upon the removal of the arm 49 from engagement with the pinion 13, the latter moves backwardly under the impulse of the spring 44, ready to add the next item on the total detail adder. When this takes place, the next succeeding arm 49 is in position to engage the pinion 13, so that, as the carriage moves to the right, the pinion 13 will be carried with it. There are as many arms 49 as there are detail accounting devices, 10$^a$, 10$^b$, etc., and the total of all the items that are printed in one line and that are added upon the detail adders during the movement of the carriage, is registered upon the total detail register 9. This register, therefore, will show the total of all of the items in the line, and such items may be read, printed on the paper and added on the grand total register 11.

In returning the carriage to its first position, the rack-bar 29 must be held in its forward position, as hereinbefore stated, in order to hold the arms 49 back out of engagement with the pinion 13. This necessitates the use of the by-pass 29$^a$, or some equivalent means, for enabling the rack bar to pass the tabulating pins.

After all the items have been printed in a transverse line and have been added on the various detail accounting devices, as above described, the total of these items is printed in the column corresponding to the grand total adder, which operation also adds such total on the grand total register 11. The total detail adder 9 is then set back to zero ready for the next succeeding line of items. The mechanism for turning the register to zero is identical with that shown in the Laganke and Smith patent and need not be specifically described herein. The detail registering devices, 10$^a$, 10$^b$, etc., have similar set to zero mechanisms, but these registers are not set to zero until all of the various items in the various columns have been printed, so that these registers show at all times the totals of all items in their respective columns. When the columns are complete, the totals shown in the detail registers may be printed in their respective columns. Before printing these totals, however, the total detail register 9 should be set to zero, and then, as the totals of the detail registers are printed in a transverse line, the total of these totals is added on the register 9. This total of the totals showing on this register should be identical with the amount shown on the grand total register 11, so that the registers 9 and 11 furnish proof that the computations and the totals printed in the line of totals are correct. The grand total, as shown on both of the registers 9 and 11, may then be printed below the column corresponding with the grand total adder, so that, upon the completion of the printing operation, the sheet will show the total of all the various items in each vertical column, the total of all the items in each transverse line, and the grand total of all of the items.

The grand total adder 11 is also provided with a set-to-zero device, but this adder will not be reset to zero until the printing operation is completed.

While I have shown and described one embodiment of my invention, I appreciate the fact that the details shown and described may be departed from and still attain the objects of my invention, and I therefore desire it to be understood that the following claims are not intended to be limited to the specific details shown herein further than is made necessary by the specific terms embodied therein.

Having described my invention, I claim:

1. In a combined typewriter and adding machine, the combination with a shifting carriage of numerical keys, a shaft mounted upon said carriage, a master wheel mounted upon said shaft, operative connections between the master wheel and the numerical keys, a series of detail adding devices with which the said master wheel is adapted to successively engage, a total detail adding device, a pinion mounted upon said shaft, said pinion being adapted to rotate with the shaft but capable of sliding movement thereon, a yoke having arms which are pivoted upon said shaft, said arms engaging with the total detail adding device, the said pinion being confined between the arms which are pivoted upon the shaft, a spring coöperating with the yoke and pinion to push the pinion toward one of the arms of the yoke.

2. In a combined recording and adding machine, the combination with a shifting carriage, of a printing mechanism that is adapted to print numerical items in transverse lines and in vertical columns; an adding device mounted upon said carriage adapted to keep a total of the items printed in each transverse line, a shaft, a pinion upon said shaft for operating said adder, a yoke engaging the adder, said yoke being provided with arms which engage the shaft, a spring bearing against one of said arms and against the pinion, means carried by the carriage for moving the pinion against the pressure of the spring as the carriage moves, and means for disconnecting the pinion from its moving means whereby the pinion is returned to its initial position.

3. In a recording and adding machine, the combination with a shifting carriage, of a printing device carried by said carriage, said printing device being adapted to print numerical items in transverse lines, an adding device adapted to keep a total of the items printed in each transverse line, a pinion gearing with said adding device, a spring bearing against said pinion for moving the same in one direction, a pivoted arm mounted upon the said carriage for engaging the pinion to move the same as the carriage moves, and means for moving the arm about its pivot to disengage the pinion whereby the pinion returns to its initial position.

4. In a recording and adding machine, the combination with a shifting carriage, of a printing device carried by said carriage, said printing device being adapted to print numerical items in transverse lines, an adding device adapted to keep a total of said items, a pinion for operating said adder, a spring for moving said pinion in one direction, a plurality of pivoted arms mounted upon the said carriage adapted to successively engage the said pinion for moving the pinion against the action of the spring as the carriage is moved, and means for causing the said arms to disengage the pinions.

5. In a recording and adding machine, the combination with a shifting carriage, of a printing device carried by said carriage, said printing device being adapted to print numerical items in transverse lines, an adding device adapted to keep a total of the said items, a pinion for operating said adder, resilient means for holding said pinion in a predetermined position, a member mounted upon the carriage and adapted to engage the pinion to move the said pinion against the action of the resilient means as the carriage is moved, and means for disengaging the said member from the pinion whereby the pinion is returned to its initial position by the resilient means.

6. In a recording and adding machine, the combination with a shifting carriage, of a printing device carried by said carriage, said printing device being adapted to print numerical items in transverse lines, an adding device adapted to keep a total of the said items, a pinion for operating said adder, a resilient means for moving said pinion in one direction, a member mounted upon the carriage and adapted to engage the pinion to move the same as the carriage is moved, a tabulating device, and connections between the tabulating device and the said member for moving the carriage, whereby, upon the operation of the tabulating device the pinion is released and moved to its initial position by the resilient means.

In testimony whereof, I hereunto affix my signature in the presence of two witnesses.

HOLMES MARSHALL.

Witnesses:
JOHN D. HAYES,
LOUIS J. CATLIN.